United States Patent [19]

Childers et al.

[11] Patent Number: 5,189,387
[45] Date of Patent: Feb. 23, 1993

[54] SURFACE MOUNT DEVICE WITH FOLDBACK SWITCHING OVERVOLTAGE PROTECTION FEATURE

[75] Inventors: Richard K. Childers, Foster City; John H. Bunch, Menlo Park, both of Calif.

[73] Assignee: Electromer Corporation, Palo Alto, Calif.

[21] Appl. No.: 728,605

[22] Filed: Jul. 11, 1991

[51] Int. Cl.$^5$ ............................................. H01C 7/10
[52] U.S. Cl. ............................ 338/20; 338/226; 338/313; 338/322; 338/328
[58] Field of Search .............. 338/20, 21, 226, 322, 338/328, 313

[56] References Cited

U.S. PATENT DOCUMENTS 3,685,026  8/1972  Wakabayashi et al. ......... 338/20 X
3,959,763  5/1976  Sibley et al. ..................... 338/21
4,672,358  6/1987  Pryst et al. ..................... 338/226
4,726,991  2/1988  Hyatt et al. ..................... 338/21 X
4,977,357  12/1990  Shrier ............................. 338/21
5,068,634  11/1991  Shrier ............................. 338/21
5,111,179  5/1992  Flassayer et al. ................ 338/313

*Primary Examiner*—Marvin M. Lateef
*Attorney, Agent, or Firm*—Flehr, Hohbach, Test, Albritton & Herbert

[57] ABSTRACT

A nonlinear resistive surface mount device for protecting against electrical overvoltage transients is disclosed which includes a pair of conductive sheets and a foldback switching material disposed between the pair of conductive sheets. This configuration serves to connect the conductive sheets by a foldback switching mechanism thereby providing predetermined resistance when the voltage between the conductive sheets exceeds a predetermined voltage.

7 Claims, 5 Drawing Sheets

$T_2 \times 1.25 = 8\mu s$
Exponential 8/20μsec Waveform

5,189,387

SURFACE MOUNT DEVICE WITH FOLDBACK SWITCHING OVERVOLTAGE PROTECTION FEATURE

BRIEF DESCRIPTION OF THE INVENTION

This invention relates generally to a varistor-like, nonlinear resistive transient overvoltage protection devices. More particularly, it relates to electrical surface mount devices with an overvoltage protection feature.

BACKGROUND OF THE INVENTION

All types of conductors are subject to transient voltages which potentially damage associated unprotected electronic and electrical equipment. Transient incoming voltages can result from lightning, electromagnetic pulses, electrostatic discharges, or inductive power surges.

More particularly, transients must be eliminated from electrical circuits and equipment used in radar, avionics, sonar and broadcast. The need for adequate protection is especially acute for defense, law enforcement, fire protection, and other emergency equipment. A present approach to suppressing transients is to use silicon p-n junction devices. The p-n junction devices are mounted on a substrate, commonly a circuit board. They serve as a dielectric insulator until a voltage surge reaches a sufficient value to generate avalanche multiplication. Upon avalanche multiplication, the transient is shunted through the silicon device to a system ground.

Several problems are associated with this prior art solution and other approaches which analogously use Zener diodes, varistors, and gas discharge tubes.

Many of the foregoing circuits and equipment employ components which are mounted on the surface by soldering leads to the conductors of a printed circuit board or conductors in a hybrid circuit. There is a need for a transient protection device which can be surface mounted.

An ideal transient protection device should have the capability of handling high energy with high response time, in the nanosecond or even sub-nanosecond range.

OBJECTS AND SUMMARY OF THE INVENTION

It is a general object of the present invention to provide a transient overvoltage protection surface mount device.

It is a related object of the invention to provide a transient overvoltage protection device which is inexpensive and simple in construction.

It is a further object of the invention is to provide a fast response transient overvoltage protection surface device.

Another object of the invention is to provide an overvoltage protection device capable of handling high energy.

Yet another object of the invention is to provide a transient overvoltage protection surface mount device with a nanosecond response time.

These and other objects are achieved by a surface mount device adapted to be mounted between two surface conductors which includes spaced apart conductive sheets with a foldback switching material placed therebetween. This configuration serves to connect the conductive sheets to one another by a foldback switching mechanism when the voltage between the conductors and the plate exceeds a predetermined voltage. In one configuration, the sheets are disposed face-to-face and in another configuration, the sheets are side-by-side.

BRIEF DESCRIPTION OF THE DRAWINGS

Other objects and advantages of the invention will become apparent upon reading the following detailed description with reference to the drawings, in which.

DETAILED DESCRIPTION OF THE INVENTION

Figure 1:
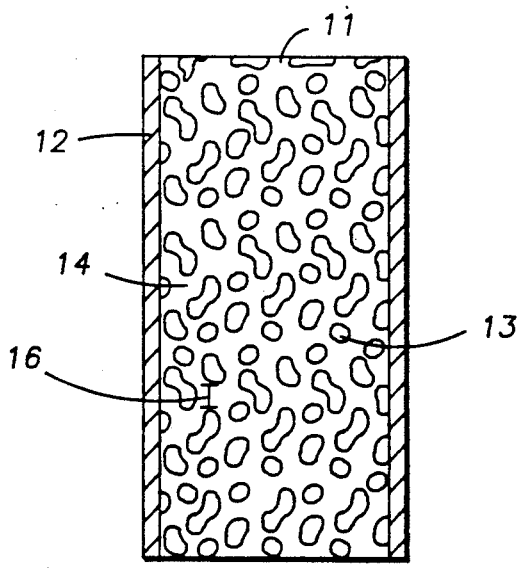
FIG. 1 is an enlarged cross sectional view of a surface mount device subassembly.

Turning now to the drawings, wherein like components are designated by like reference numerals in the various figures, attention is initially directed to FIG. 1. A surface mount device subassembly is depicted having switching material composed of conductive particles that are dispersed in an insulating matrix or binder using standard mixing techniques between two electrodes. The on-state resistance of the material is low. The conductive particles are sufficiently far apart that the off-state resistance of the material is determined largely by the resistance of the insulating matrix or binder. The matrix or binder serves two roles electrically: first it provides a media for tailoring separation between conductive particles, thereby controlling the clamping voltage, and second as an insulator it allows the electrical resistance of the homogeneous dispersion to be tailored.

Composite material 11 is positioned between the spaced conductive sheets 12. Material 11 includes particles 13 dispersed and supported within binder 14. The on-state resistance of material 11 is determined by the inter-particle spacing 16. The clamping voltage for switching from a high resistance to a low resistance state is determined by the separation distance, that is, by the inter-particle spacing 16 and the electrical properties of the insulating matrix or binder material 14. In the off-state, this potential barrier is relatively high and results in a high electrical resistivity for the switching material. The specific value of the bulk resistivity can be tailored by selection of the position of the matrix or binder itself and to a smaller extent by adjusting the volume percent loading of the conductive articles in the matrix or binder, the particle size and shape. For a well blended, homogeneous system, the volume percent loading of a particular size of particles determines the average inter-particle spacing 16.

Inter-particle spacing 16 is selected to avoid quantum mechanical tunneling, which would lead to a decrease in the resistance of the material at applied voltages generally greater than about 65% of the clamping voltage. In general it has been found that a spacing between the conductive particles of at least 1,000 Å (Angstrom units), for example 5,000 Å is sufficient to avoid quantum mechanical tunneling. More preferably, the spacing between the conductive particles is at least 1 micron, for example, 5 microns. Most preferably, the inter-particle spacing is at least 10 microns.

In general, the conductive particles used in this invention have particle sizes from 10 to 200 microns. However, it has been found that, in general, better results are obtained with larger particles, for example, particles at least 20 microns in size, preferably at least 30 microns in size, more preferably at least 35 microns in size, and for example, most preferably, at least 40 microns in size.

In one embodiment, conductive sheets 12 were copper sheets 5.75 inches wide by 5.75 inches long by approximately 0.002 inches thick. Material 11 was placed between conductive sheets 12. Thus, a large copper/material/copper sandwich results. Final surface mount devices are produced from this layer unit in one of several ways, including punching, die cutting, or stamping. The maximum size of the particles is determined by the spacing between the conductive sheets. The conductive sheet spacing should equal at least 2 particle diameters, for example, 3 particle diameters, preferably at least five particle diameters. For example, using conductive sheet spacing of approximately one thousand microns, maximum particle size is approximately two hundred microns. Smaller particle sizes can also be used with greater particularly as discussed above.

In the above mentioned embodiment, the resultant composite was placed in a large two-platen hydraulic press and compressed to a thickness of 0.030 inches. The pressed composite was then pre-cured in the press at 120 degrees Celsius, 3000 PSI for 15 minutes, then placed in an oven where it was cured at 125 degrees Celsius for four hours. The device subassembly was cut away from the resultant composite sheet.

Figure 2:
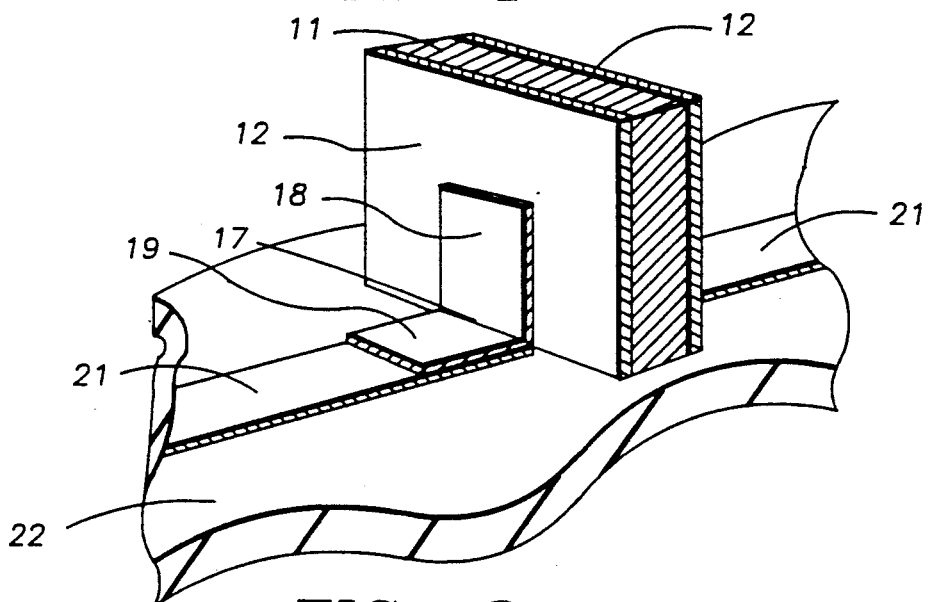
FIG. 2 is a perspective view of the overvoltage protection surface mount device mounted on a printed circuit board.
Figure 3:
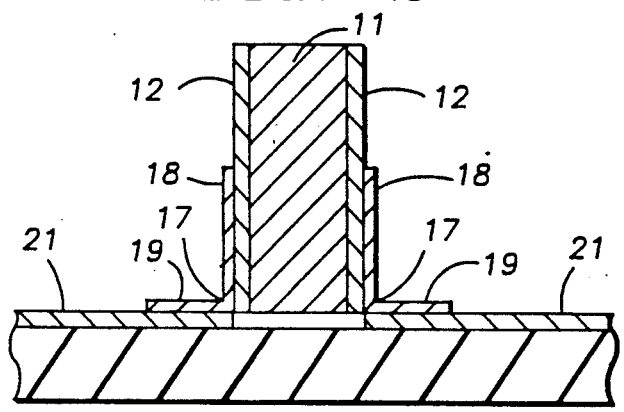
FIG. 3 is a sectional view of the overvoltage protection surface mount device mounted on a printed circuit board or hybrid circuit.

FIGS. 2 and 3 depict an overvoltage protection device incorporating a cut away portion of the subassembly of FIG. 1. Referring to FIG. 3, a surface mount device is shown which has L-shaped conductors or leads 17 having first planar portions 18 connected to corresponding conductive sheets 12 and having second planar portions 19 connected to spaced surface leads 21 carried by an insulating board 22 and serving to interconnect the surface leads 21 when an overvoltage is applied therebetween. One of said leads may be a ground lead.

As the FIG. 3 suggests, the overvoltage protection apparatus of the present invention has a moldable design. As a result of this moldable design, material 11 is readily positioned contiguously between conductive sheets 12. Conductive sheets 12 may be of any shape deemed necessary by the user. The size of the conductive sheets will determine the power handling capabilities.

This moldable design with surface sheets 12 and leads 17 obviates problems in the prior art with mounting discrete elements such as diodes and varistors on a surface conductor. These prior art connections between surface leads 21 and the discrete elements are not as rugged as the unitary moldable design of the present invention.

Figure 4:
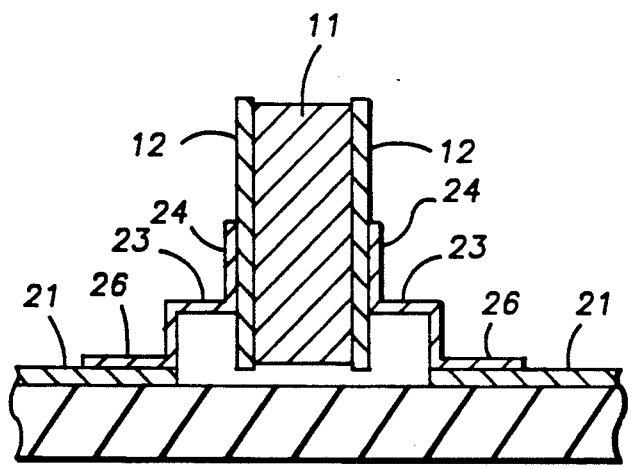
FIG. 4 is a sectional view of the overvoltage protection surface mount device with step configured conductors.

In certain instances, the surface conductors are widely spaced. Referring to FIG. 4, a surface mount device is shown which has step configured leads 23 having first planar portions 24 connected to corresponding conductive sheets 12 and having second planar portions 26 connected to surface leads 21. This provides for connection to widely spaced conductors.

Figure 5:
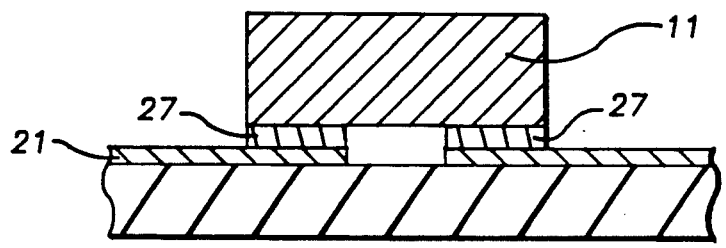
FIG. 5 is a side view of the overvoltage protection surface mount device with spaced apart side-by-side conductive planar sheets for attachment to spaced conductors.

In other instances, a horizontal configuration is desirable. Referring to FIG. 5, a surface mount device is shown in which the conductive sheets 27 are spaced apart for attachment to spaced surface leads 21. The foldback switching material is between the edges of the sheets adjacent the surface.

Regardless of the particular embodiment utilized, the invention operates in the same manner. A transient on conductive sheet 12 induces the composite material 11 to switch from a high-resistance state to a low-resistance state thereby largely clamping the voltage to a safe value and shunting excess electrical current from conductive sheet 12 through the composite material 11, which is ultimately connected to a system ground.

Several advantages are derived from the foldback switching material in the surface mount device of the present invention. First, the resistance in the off-state is extremely high, typically greater than 10 (to the 9th) ohms, and often greater than 10 (to the 10th) ohms. These values, are measured at 100 volts applied to devices such as the embodiments described herein. The advantage of the devices of the present invention is that they can be used with continuous working voltages of 100 volts while still having extraordinary high resistance (or low leakage current) and yet exhibit a clamping voltage of approximately 75 to 150 volts. A second advantage is that a very low capacitance is retained in many high frequency applications. A third advantage is the ability to handle higher energy pulses such as lightning.

The threshold voltage of surface mount devices of the present invention has been found to vary to some extent, depending inter alia on the impedance of the transient pulse source and the rise time and other electrical characteristics of the incoming pulse.

The device shown in FIGS. 2 and 3 has a rectangular plate geometry. A similar device having a disk geometry where the switching material is sandwiched between two conductive sheets with wire leads attached, was tested by applying to it an electrical pulse from a lightning simulator. The material contained in the device used the following formulation, by weight: fluorosilicone (Dow Corning LS-2840), 71.0 grams; nickel powder (particle size, 44 microns and higher, substantially spherical), 108.0 grams; silicon carbide (particle size, 1 to 5 microns), 14.0 g; and 2,4-diclorobenzoyl peroxide, 3.0 g. These ingredients were blended together on a two-roll rubber mill and pressed into sheets oven cured and shaped as described above. Table I shows typical performance characteristics from a surface mount device made from this material formulation.

TABLE I

| | |
|---|---|
| Threshold Voltage | 275 to 350 volts |
| Clamping Voltage | 100 to 150 volts |
| Electrical Resistance in off-state (100 volts applied) | 10 (to the 9th) ohms |
| Electrical Resistance in on-state | generally less than 4 ohms depending on transient pulse amplitude |
| Capacitance | 8 pico-farads |

Those skilled in the art will understand that a wide range of polymer and other binders, conductive powders, formulations and materials are possible. Other conductive particles which can be blended with a binder to form the non-linear material in this invention include metal powders of aluminum, beryllium, iron, gold, silver, platinum, lead, tin, bronze, brass, copper, bismuth, cobalt, magnesium, molybdenum, palladium, tantalum, tungsten and alloys thereof. Semiconductive particles which can be blended with the matrix or binder and conductive particles to improve the performance of the switching material in this invention include carbides including silicon carbide, titanium carbide, boron carbide, tungsten carbide, and tantalum carbide, powders based on carbon including carbon black and graphite, as well as metal nitrides and metal borides.

The primary function of the binder 14 is to establish and maintain the inter-particle spacing 16 of the conducting particles 13 in order to avoid quantum mechanical tunneling behavior during application of an electrical voltage. Accordingly, insulating binders can include but are not limited to organic polymers such as polyethylene, polypropylene, polyvinyl chloride, natural rubbers, urethanes, and epoxies, silicone rubbers, fluoropolymers such as fluorosilicones and polytetrafluoroethylene and its copolymers, and polymer blends and alloys. Other insulating binders include ceramics, refractory materials, waxes, oils, and glasses. The primary function of the matrix or binder is to establish and maintain the inter-particle spacing of the conducting particles. It is also believed that the nature of the response of the matrix material to dielectric breakdown is an important indicator of its suitability for use in this invention. Those matrix materials or material formulations that do not undergo the irreversible formation of short circuit paths on dielectric breakdown are suitable for use in this invention.

While substantially an insulator, the resistivity of binder 14 can be tailored by adding or mixing various materials which alter its electrical properties. Such materials include powdered varistors, organic semiconductors, coupling agents, and antistatic agents.

A wide range of formulations can be prepared following the above guidelines to provide materials with various inter-particle spacings which give clamping voltages from fifty volts to fifteen thousand volts. The inter-particle spacing is determined by the particle size and volume percent loading. The device thickness and geometry also govern the final clamping voltage.

Clamping Voltage is a function of Volume Percent Conductor for materials of the same thickness and geometry, and prepared by the same mixing techniques as heretofore described.

Figure 6:
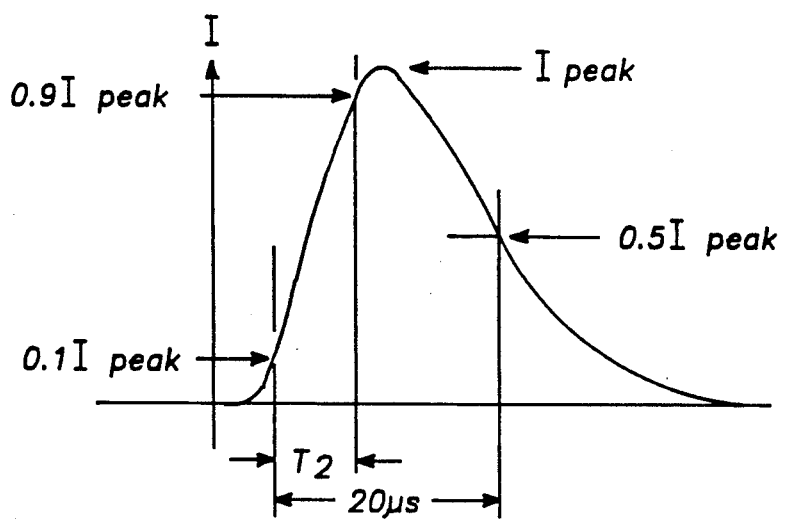
FIG. 6 is a schematic of a waveform which simulates a transient pulse resulting from lighting discharges.
Figure 7:
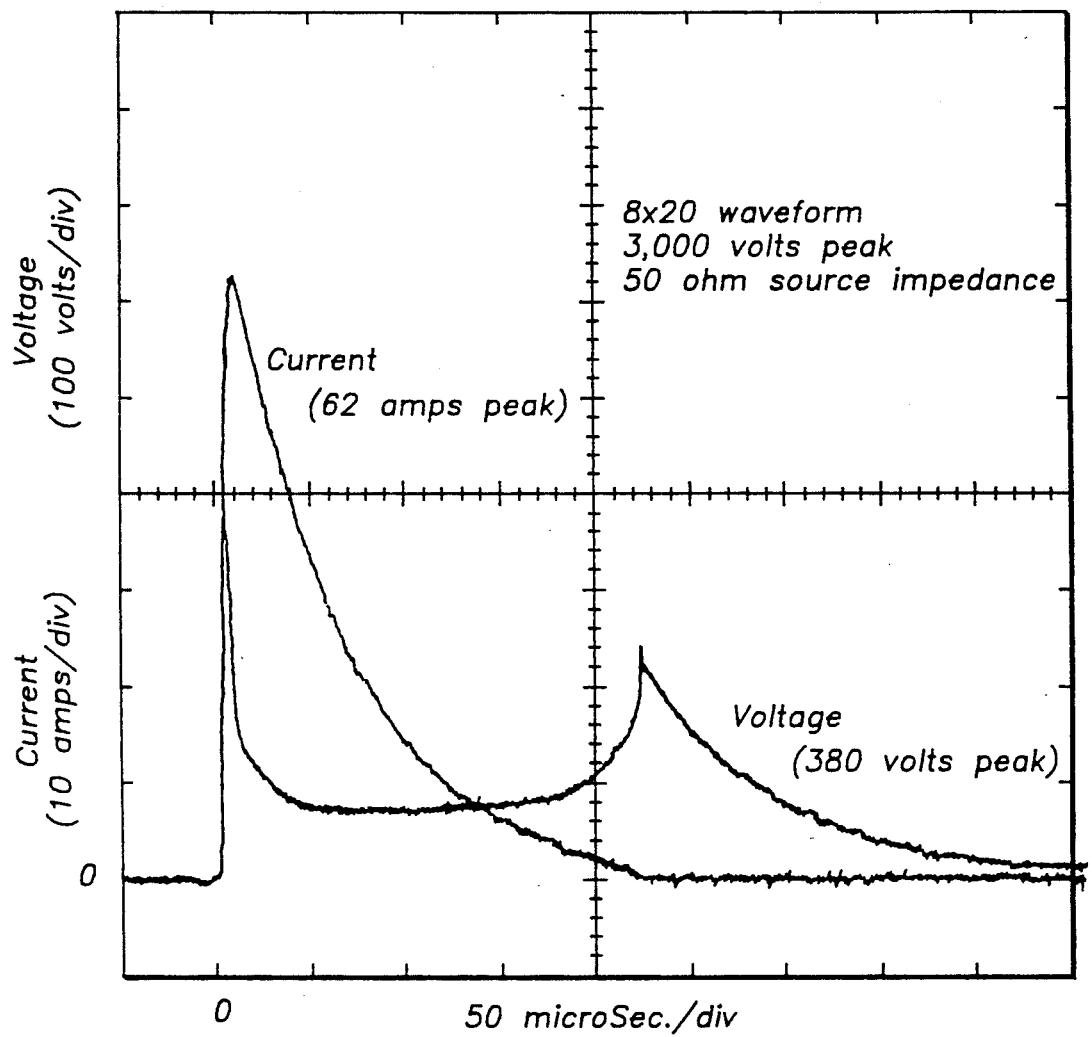
FIG. 7 is an graph of voltage across and current through a device as shown in FIG. 3, subjected to the pulse shown in FIG. 4.

Referring to FIG. 6, depicted therein is a schematic of a waveform which simulates a transient pulse resulting from lightning discharges. A device having the configuration of FIG. 2 and 3, with circular conductive sheets and containing the foldback switching material as described above, was tested by applying to an electrical pulse from a lighting simulator. The incoming pulse used is characterized as an 8/20 microsecond dual exponential waveform, that is, the simulator will produce a pulse used short circuit conditions having the characteristics shown in FIG. 6 (as described in ANSI/IEEE 62.41-1980). This type of waveform is also known as a Combination wave (see, for example, UL1449 and IEC 65). FIG. 7 shows the response of the device to this pulse which was applied to the device through a 50 ohm source impedance. The maximum amplitude was 3000 volts. It can be seen that the device of the present invention clamped the voltage during nearly all of the pulse to a value under 100 volts.

Figure 8:
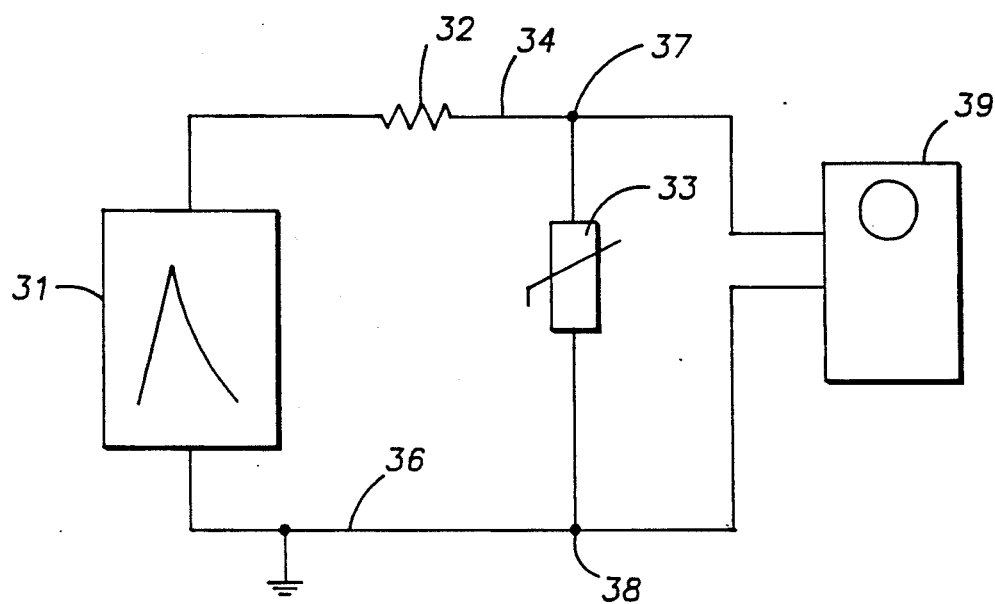
FIG. 8 is a typical test setup for measuring the response to high voltage pulses of devices made from the invention.

FIG. 8 shows a test circuit for measuring the electrical response of a device made with materials of the present invention. A fast rise-time pulse, typically one to five nanoseconds, is produced by pulse generator 31. The output impedance 32 of the pulse generator is fifty ohms. The pulse is applied to the overvoltage protection apparatus 33 which is connected between the high voltage line 34 and the system ground 36. The voltage versus time characteristics of the non-linear device are measured at points 37 and 38 with a high speed storage oscilloscope 39.

Figure 9:
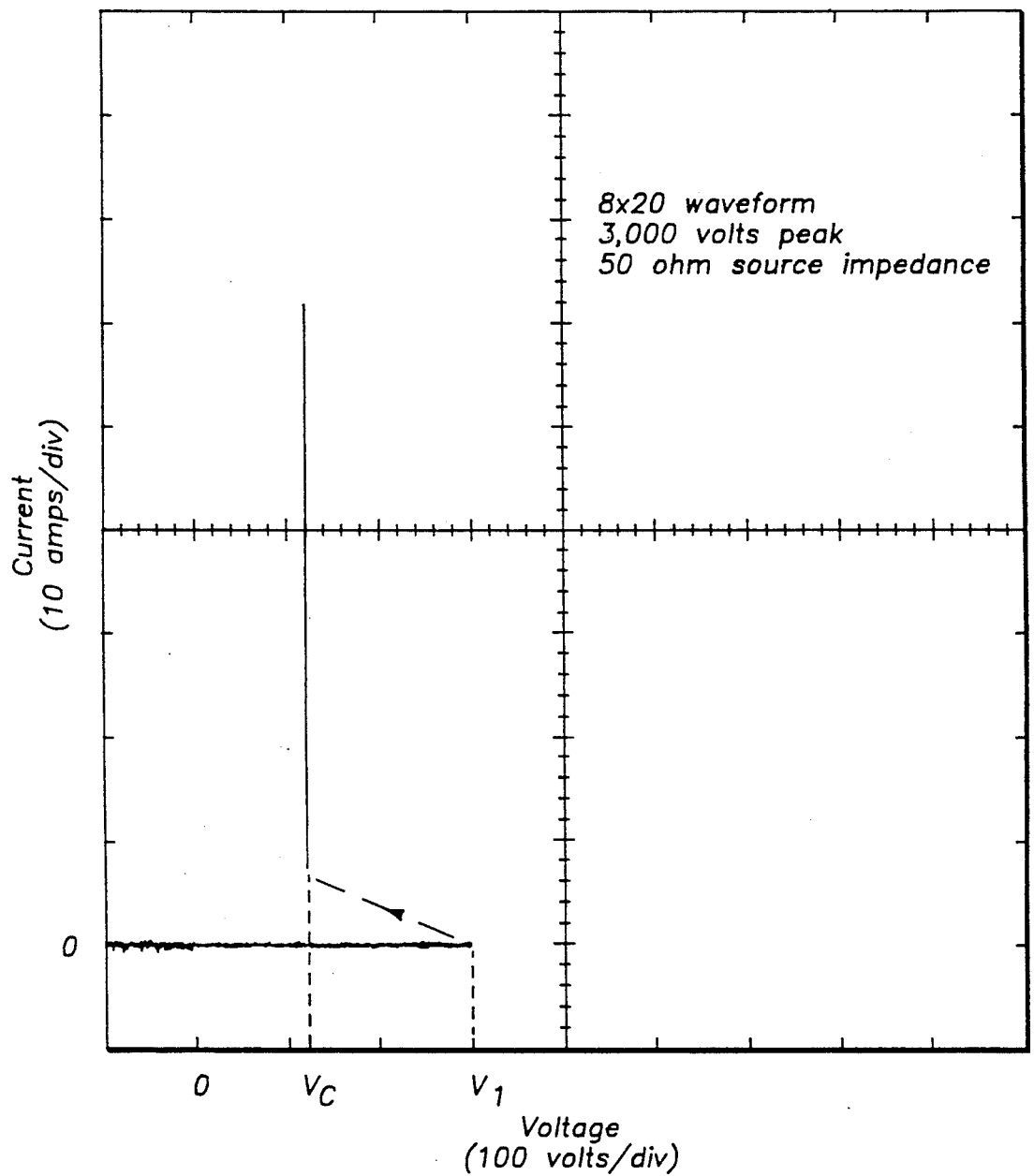
FIG. 9 is a graph of current versus voltage for an embodiment of the present invention.

The current-voltage characteristics of a foldback switching surface mount device of the present invention are shown in FIG. 9 over a wide voltage range. This curve is typical of a device made from materials from Example I described above. The foldback switching nature of the material and surface mount device is readily apparent from FIG. 8. The voltage level labeled $V_1$ is referred to as the threshold voltage, the voltage $V_c$ is referred to as the clamping voltage. Below the clamping voltage $V_c$, the resistance is constant, or ohmic, and very high, typically at least 10 meg-ohms and often as high as 10 (to the 9th) ohms. Above the clamping voltage $V_c$ the resistance is extremely low, for example, less than 10 ohms for the surface mount devices of the present invention.

The process for fabricating the switching material of the present invention includes standard polymer processing techniques and equipment. A preferred process uses a two roll rubber mill for incorporating the conductive particles into the binder material. The polymer material is banded on the mill, the crosslinking agent (if required) is added, and then the conductive particles are added slowly to the binder. After complete mixing of the conductive particles into the binder, it is sheeted off the mill rolls. Other polymer processing techniques can be used including Banbury mixing, extruder mixing and other similar mixing equipment.

Thus, it is apparent that there has been provided, in accordance with the invention, an overvoltage protection device that fully satisfies the objects, aims and advantages set forth above. While the invention has been described in conjunction with specific embodiments thereof, it is evident that many alternatives, modifications, and variations will be apparent to those skilled in the art in light of the foregoing description.

We claim:

1. A transient overvoltage protection surface mount device for mounting between spaced flat conductors carried by an insulating substrate for protecting against electrical overvoltage transients between said conductors comprising:

spaced apart conductive sheets;

associated spaced conductors associated with said spaced apart conductive sheets;

a foldback switching material disposed between said pair of spaced conductive sheets serving to link said pair of conductive sheets by a foldback switching mechanism when the voltage between said conductive plates exceeds a predetermined voltage;

means for connecting each of said sheets to an associated space conductor; and wherein said foldback switching material is a matrix formed of only homogeneously distributed, conductive particles, said particles having a particle size in the range of between greater than 10 microns to two hundred microns and having a spacing between said particles in the range of at least of 1000 angstroms to provide said foldback switching mechanism therebetween; and a binder selected to provide a foldback media and predetermined resistance between said conductive particles.

2. A transient overvoltage protection surface mount device as recited in claim 1, wherein:

said spaced sheets face one another; and said connecting means comprises L-shaped leads having first and second planar portions at right angles to one another, said first planar portions connected to said spaced sheets and said second planar portions connected to said associated spaced conductors.

3. A transient overvoltage protection surface mount device as recited in claim 2, further comprising:

means for connecting each one of said first planar portions to a corresponding one of said pair of conductive sheets; and means for connecting each one of said second planar portions to an associated flat conductor.

4. A transient overvoltage protection surface mount device as recited in claim 1, wherein:

said spaced sheets face one another; and said connecting means comprises a planar lead having first and second planar end portions and at least four planar portions, adjacent ones of said planar portions being at right angles to one another, said planar portions forming a step configuration; and wherein said first and second planar end portions are perpendicular to on another.

5. A transient overvoltage protection surface mount device as recited in claim 4, further comprising:

means for connecting each one of said first planar end portions to a corresponding one of said pair of conductive sheets; and means for connecting each one of said second planar end portions to an associated flat conductor.

6. A transient overvoltage protection surface mount device as recited in claim 1, wherein:

said pair of spaced apart conductive sheets are side-by-side;

said pair of spaced apart conductive sheets lie in the same plane; and said spaced apart conductive sheets are disposed on the same surface of said foldback switching material.

7. A transient overvoltage protection surface mount device as recited in claim 6, wherein said pair of conductive sheet has an inner surface and surface opposite said inner surface which in an outer surface; and wherein said device further comprises:

means for connecting each of said pair of conductive sheets to locations at opposite ends of said foldback switching material; and means for connecting each of said pair of conductive sheets' outer surface to an associated flat conductor.

* * * * *